US010825240B2

(12) United States Patent
Fite-Georgel et al.

(10) Patent No.: US 10,825,240 B2
(45) Date of Patent: Nov. 3, 2020

(54) AUTOMATIC MAGNETOMETER CALIBRATION FOR MOBILE DEVICES

(71) Applicant: Google LLC, Mountain View, CA (US)

(72) Inventors: Pierre Fite-Georgel, Mountain View, CA (US); Aveek Purohit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 269 days.

(21) Appl. No.: 15/798,805

(22) Filed: Oct. 31, 2017

(65) Prior Publication Data
US 2018/0120109 A1  May 3, 2018

Related U.S. Application Data

(60) Provisional application No. 62/416,078, filed on Nov. 1, 2016.

(51) Int. Cl.
G06T 17/05  (2011.01)
G01C 17/38  (2006.01)
(Continued)

(52) U.S. Cl.
CPC .............. G06T 17/05 (2013.01); G01C 17/38 (2013.01); G01C 21/20 (2013.01); G05D 1/0274 (2013.01); G06F 1/1694 (2013.01); G06F 1/325 (2013.01); G06F 3/038 (2013.01); G06F 3/0346 (2013.01); G06K 9/00664 (2013.01); G06K 9/00671 (2013.01); G06K 9/623 (2013.01); G06T 7/246 (2017.01); G06T 7/73 (2017.01);
(Continued)

(58) Field of Classification Search
CPC ..... G01C 17/38; G06F 3/0346; G06F 1/1694; G06F 3/038; G05D 1/0274; G06T 17/05
See application file for complete search history.

(56) References Cited

U.S. PATENT DOCUMENTS 7,451,549 B1 * 11/2008 Sodhi .................... G01C 17/38
33/356
9,506,755 B2 * 11/2016 Tu .......................... G01C 17/38
(Continued)

OTHER PUBLICATIONS

Written Opinion of the International Preliminary Examing Authority dated Nov. 9, 2018 for corresponding International Application No. PCT/US2017/059291, 14 pages.
(Continued)

Primary Examiner — Mohamed Charioui

(57) ABSTRACT

A method that includes monitoring, by a processor of a mobile device, a stream of magnetic field measurements generated by a first sensor as the mobile device is manipulated by a user, with each magnetic field measurement representing an orientation of the mobile device relative to a reference frame. The method also includes a processor that determines a point on the surface of a magnetometer calibration sphere associated with the orientation of the mobile device, and storing the magnetic field measurement to a corresponding data bin, each data bin associated with the corresponding point on the surface of the sphere. The method continues with when the processor determining that the number of data bins containing magnetic field measurements exceeds a specified threshold, the processor triggers a magnetometer calibration process for an attached magnetometer.

20 Claims, 10 Drawing Sheets

(51) Int. Cl.

| | |
|---|---|
| *G01C 21/20* | (2006.01) |
| *G06F 1/16* | (2006.01) |
| *G06F 3/038* | (2013.01) |
| *G06K 9/00* | (2006.01) |
| *G06T 7/246* | (2017.01) |
| *G06T 7/73* | (2017.01) |
| *G06K 9/62* | (2006.01) |
| *G06T 19/00* | (2011.01) |
| *G06F 3/0346* | (2013.01) |
| *G06F 1/3234* | (2019.01) |
| *G05D 1/02* | (2020.01) |
| *G06F 3/01* | (2006.01) |
| *G01C 17/28* | (2006.01) |

(52) U.S. Cl.
CPC ............ *G06T 19/003* (2013.01); *G01C 17/28* (2013.01); *G06F 3/012* (2013.01); *G06K 9/00241* (2013.01); *G06T 2207/10028* (2013.01); *G06T 2207/20076* (2013.01); *G06T 2207/20081* (2013.01)

(56) References Cited

U.S. PATENT DOCUMENTS

| | | | |
|---|---|---|---|
| 9,739,635 B2 * | 8/2017 | Funk | G01C 25/00 |
| 2013/0006573 A1 | 1/2013 | Brunner et al. | |
| 2013/0320963 A1 * | 12/2013 | Carmel-Veilleux | G01R 33/0035 324/200 |
| 2014/0336968 A1 | 11/2014 | Tu et al. | |
| 2015/0081242 A1 * | 3/2015 | Chowdhary | G01C 17/38 702/104 |
| 2015/0304652 A1 * | 10/2015 | Spas | G01C 21/165 348/36 |
| 2017/0160086 A1 | 8/2017 | Kesäniemi | |
| 2017/0343349 A1 | 11/2017 | Han et al. | |

OTHER PUBLICATIONS

International Preliminary Report on Patentability dated Feb. 14, 2019 for corresponding International Application No. PCT/US2017/059291, 14 pages.

International Search Report and Written Opinion dated Feb. 13, 2018 for PCT Application No. PCT/US2017/059291, 24 pages.

* cited by examiner

SOFT IRON DISTORTION

ORIENTATION LOOK GRAPH

AUTOMATIC MAGNETOMETER CALIBRATION FOR MOBILE DEVICES

CROSS-REFERENCE TO RELATED APPLICATIONS

The present application is related to and claims priority to the following application, the entirety of which is incorporated by reference herein: U.S. Provisional Patent Application Ser. No. 62/416,078, entitled "Methods and Systems for VR/AR Functionality in a Mobile Device," filed Nov. 1, 2016.

BACKGROUND

Field of the Disclosure

The present disclosure relates generally to magnetometers and more specifically to calibrating magnetometers in mobile devices.

Description of the Related Art

Magnetometers are sensors that provide a reference (e.g. magnetometer 3-axis magnetic field measurements or mag field measurements) to magnetic north as an aid in determining direction and orientation of a device the magnetometer is associated with. Magnetometers are employed in many mobile devices including virtual reality and augmented reality (VR/AR) systems, manned and unmanned vehicles, cell phones, head-mounted transceivers, controllers, and other systems that frequently include mobile elements. Magnetometers require periodic calibration to ensure accurate results. A calibration process reduces the impact of hard-iron and soft-iron disturbances and corrects the magnetometer data values to generate accurate mag field measurements. Conventional methodologies may use a device's operating system (OS) to trigger a calibration process. One calibration process includes comparing the difference between a known magnetic field (e.g. the earth's magnetic field) and a local magnetic field as sensed by the magnetometer. The process then calculates a set of correction values to be added to the mag field measurements to create calibrated mag field measurements. Another calibration process corrects for variations in the earth's magnetic field by using data from a Global Positioning Satellite (GPS) system to determine the device's geographic location, generates magnetometer correction values based on the expected magnetometer data values vs. the measured values, and adds the correction values to the measured values. Magnetometer calibration is a continual process, as local hard-iron and soft-iron disturbances change due to movement of metallic objects in the device's environment. OS-based calibration processes commonly direct the user of the device to actively participate by directing the user to move the device in a very specific pattern or motion (for example, a double tilt or figure-8 motion). This places a burden on the user and delays calibration until the user is able and willing to perform the requested action. This active-user-required calibration approach is further exacerbated by the fact that a separate magnetometer calibration process may be requested by each open software application, and thus the user may be asked to actively participate in multiple calibration processes for different software applications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
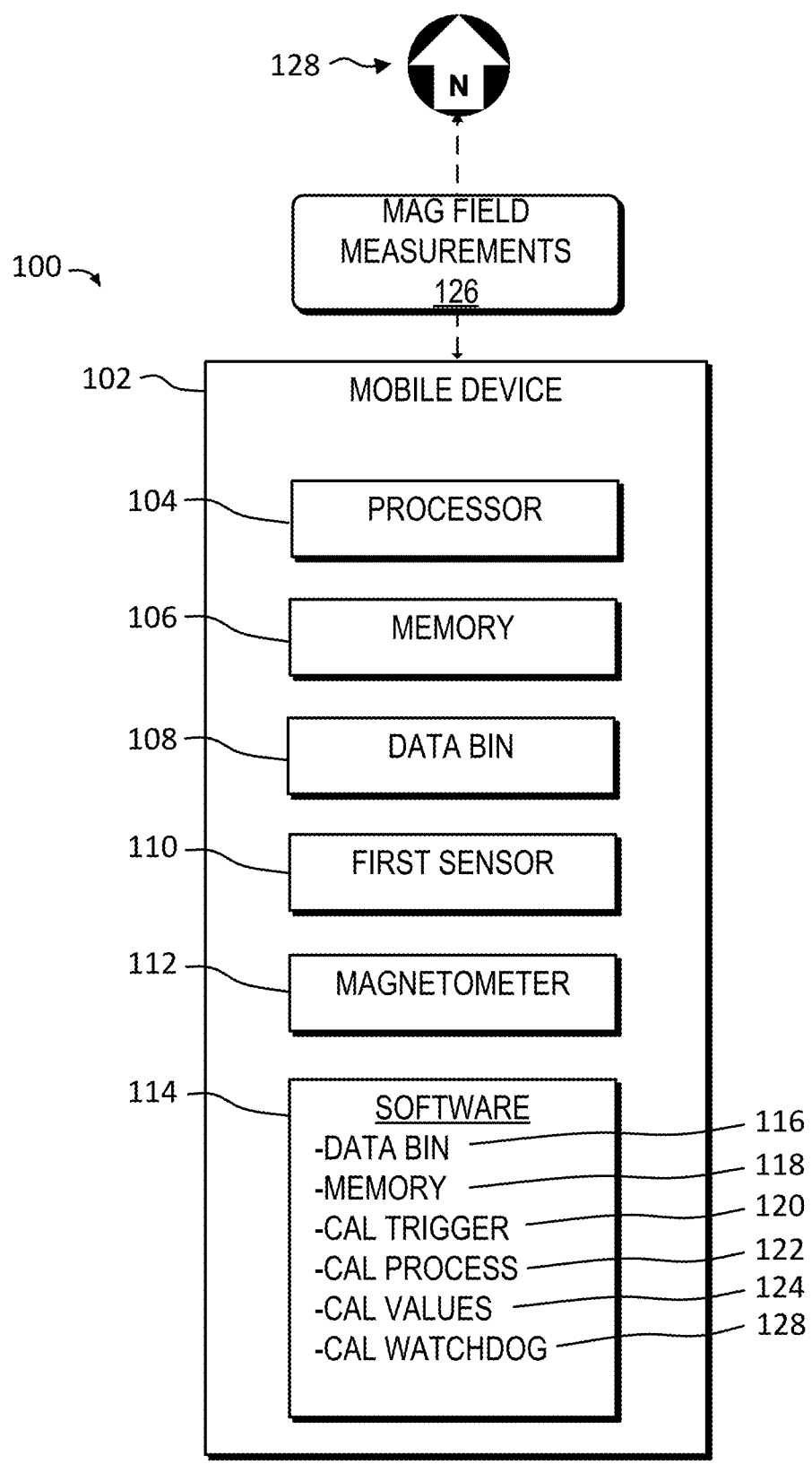
FIG. 1 is a is a block diagram illustrating an automatic magnetometer calibration system for a mobile device employing a magnetometer in accordance with some embodiments.

The following description is intended to convey a thorough understanding of the present disclosure by providing a number of specific embodiments and details involving the automatic calibration of a magnetometer by utilizing a user's otherwise non-specified movement or other manipulation of the mobile device during normal operations, and recording the mag field measurements generated as a result of the movement. The user's non-specified movement of the mobile device is a result of the device's movement by the user for everyday purposes such as receiving and sending phone calls, accessing the Internet, running software applications, and traveling with the mobile device. That is, the user's non-specified movement is non-specified in that it is not in response to an implied or specified movement pattern requested by the mobile device as part of a calibration process. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-10 illustrate methods and systems for automatic magnetometer calibration for a mobile device. The mobile device (e.g. a cell phone, a VR/AR system, an electronic compass, and the like) can employ at least one magnetometer for sensing magnetic north and aiding in determining the orientation of the mobile device in relation to a reference frame or a defined coordinate system. With a calibrated magnetometer, the mobile device tracks its own orientation in relation to the earth's magnetic field and magnetic north. The methods and systems disclosed herein are described as "automatic" as the mobile device triggers and executes a magnetometer calibration process by using the device's non-specific (e.g., seemingly random) movement during normal operations, and without requiring the user to move the device in a specific pattern. This automatic calibration process includes recording the magnetometer's mag field measurements. The mobile device's non-specified movement orients the magnetometer towards distinct points on a surface of a virtual magnetometer calibration sphere surrounding, and centered on, the mobile device. Each data bin of a plurality of data bins is associated with a corresponding point on the surface of the magnetometer calibration sphere. When the magnetometer is oriented towards a particular point on the magnetometer calibration sphere, the mobile device tracks the event by storing a value in the data bin associated with that point, thus recording the event. Additionally, when the mobile device is oriented towards a particular point on the magnetometer calibration sphere, orientation and direction measurements, as generated by one or both of a first sensor, such as an image sensor or an inertial measurement unit (IMU), and the magnetometer, is also stored in memory. When the mobile device writes to a number of data bins exceeding a predetermined threshold, the mobile device triggers the magnetometer calibration process. The mobile device can calibrate the magnetometer by any of a variety of calibration processes, such as comparing the measured mag field measurements to a stored set of expected mag field measurements based on the location of the mobile device as determined by a GPS system. The mobile device then receives mag field measurements from the magnetometer and adds a correction factor to generate calibrated mag field measurements. The mobile device then uses the calibrated mag field measurements to establish the orientation of the mobile device to aid in position, orientation, and compass functions for software applications running on the mobile device.

FIG. 1 is a block diagram illustrating an automatic magnetometer calibration system 100 (calibration system) for a mobile device 102 employing a magnetometer 112 in accordance with some embodiments. Calibration system 100 also includes mag field measurements 126, generated by the magnetometer 112, and a magnetic north reference 128. In at least some embodiments, the mobile device 102 can be a cell phone, a portable computer, or a navigation device, while in other embodiments, the mobile device 102 can be a head-mounted display (HMD) system for VR/AR applications. The calibration system 100 disclosed herein may be implemented by any of a variety of mobile devices 102 implementing a magnetometer. Other embodiments are possible and are not limited to the examples disclosed therein.

As a general overview of the operation of the mobile device 102, the mobile device 102 further includes a processor 104, a plurality of memory 106, a set of data bins 108, a first sensor 110, and software 114 running an OS and applications. The processor 104 executes instructions to interact with the user, control peripheral devices, and execute applications. Software 114 applications include, but are not limited to, a data bin read/write process 116 for reading and writing magnetometer orientation data to the data bins 108, a memory read/write process 118 for reading and writing mag field measurements to memory 106, a calibration trigger process 120 for monitoring data bin 108 usage and initiating a calibration process 122, the calibration process 122 for executing a calibration procedure, an arithmetic process 124 for calculating correction values and quality-of-fit values of the mag field measurements 126, and a calibration watchdog process 128 to monitor the quality of the mag field measurements 126. The memory 106 includes cache and general memory for storage of data, including location data, mag field measurements 126 from the magnetometer 112, and pose data from the first sensor 110. The plurality of data bins 108 are a form of additional memory that is associated with storing magnetometer orientation data. The plurality of data bins 108 may be represented by entries in a content addressable memory (CAM), entries in a register file, and the like To support location and orientation applications, the mobile device 102 keeps track of its own pose within a reference frame environment. As used herein, the term "pose" refers to the position of an object, the orientation of the object, or a combination thereof. Thus, the mobile device 102 can keep track of its position within the environment, can keep track of its orientation within the environment, or can keep track of both its position and its orientation. In the illustrated example of FIG. 1, the mobile device 102 includes the first sensor 110 to assist in pose determination. In particular, the first sensor 110 periodically or continuously generates pose information for the mobile device 102 based on one or more motion sensors of the first sensor 110, such as one or more accelerometers, image sensors, gyroscopes, or a combination thereof. In the following disclosure, the first sensor 110 includes an accelerometer and a gyroscope. The mobile device 102 also employs the magnetometer 112 which is disposed in a known orientation relative to the mobile device 102. The magnetometer 112 senses magnetic north 128 and generates mag field measurements 126 for use by the processor 104 in determining the pose of the mobile device 102. The non-specified movements of the mobile device 102 result in the mobile device 102, and the magnetometer 112 affixed therein, to point to multiple different directions in relation to a reference direction such as magnetic north 128. In at least some embodiments, the processor 104 executes the calibration trigger process 120 which records the number of unique directions the magnetometer 112 points towards in data bins 108, while the mag field measurements 126 are stored in memory 106. When the number of unique directions as stored in the data bins 108 exceeds a threshold number, the processor 104 triggers the calibration process 122 to begin.

The calibration process 122 is a process to add a correction factor to the mag field measurements 126. The values of the correction factor are dependent upon the extent of error as sensed by the mobile device 102, and is typically location- and time-dependent. The calibration process 122 can involve any number of procedures, including but not limited to measuring the local magnetic field and comparing the field to an expected field stored in memory 106. In other embodiments, the mobile device may house the GPS system (not shown) that supplies accurate latitude and longitude data. An expected magnetic field can be retrieved from memory 106 based on the location of the mobile device 102 and compared to the magnetometer's 112 actual mag field measurements at that same location. Correction values based on the difference between the expected and actual magnetic field values can then be calculated. More details about calibration and sources of error in a magnetic field are further disclosed herein.

After the calibration process 122 is complete, the processor 104 generates calibrated mag field measurements 126 indicating where magnetic north 126 is in relation to the mobile device 102. The mag field measurements 126 are used by other processes and applications running on the mobile device 102 that requires a reference to magnetic north 126. In some embodiments, the mobile device 102 uses latitude and longitude data to ensure maximum accuracy of pose data for the mobile device 102. This can be accomplished by employing additional sensors such as the GPS sensor (not shown), an external inertial sensor, a pose sensor, a location sensor, and the like to generate position data related to a defined coordinate system.

Figure 2:
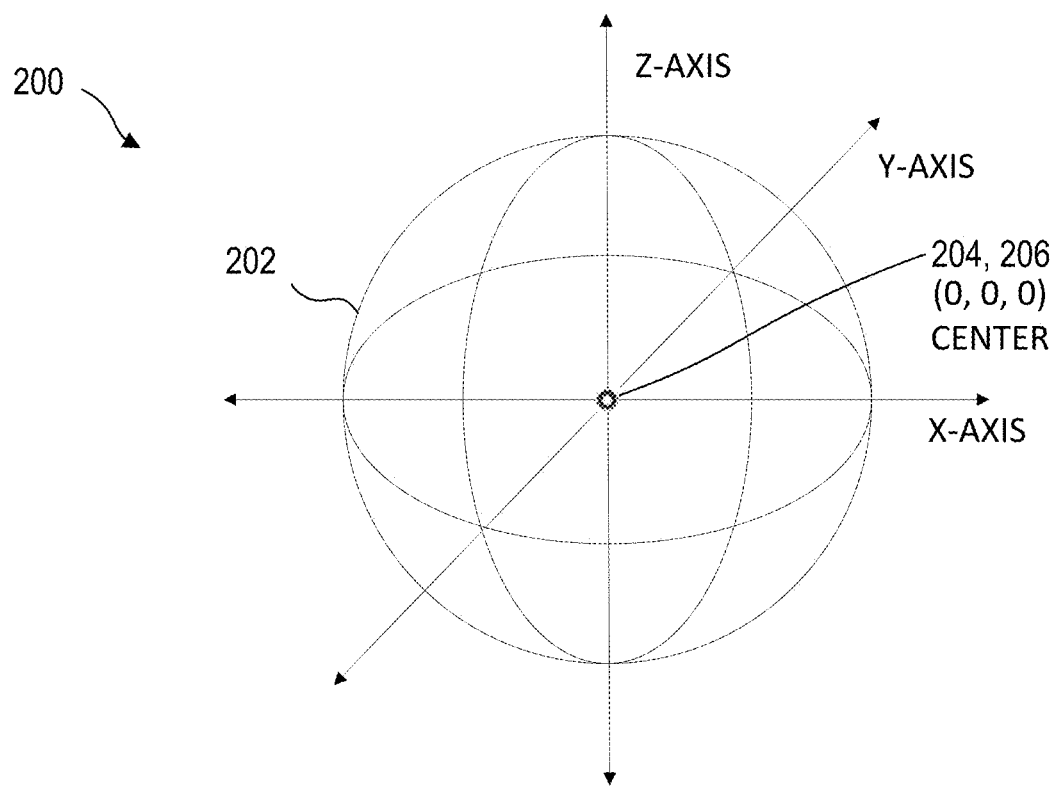
FIG. 2 is a 3-dimensional (3-D) graph illustrating an ideal magnetic field with the magnetic field centered at an origin in accordance with some embodiments.

FIG. 2 is a 3-D graph 200 illustrating an ideal magnetic field with the field 202 in the x-, y-, and z-planes with a center point 206 centered at an origin 204 at coordinates x=0, y=0, and z=0, (shown as (0, 0, 0)) in accordance with some embodiments. The ideal magnetic field 202 is an idealized illustration of the earth's magnetic field without any hard-iron or soft-iron distortion present. In the present embodiment, the surface of the ideal magnetic field 202 represents the apparent magnitude values of the earth's magnetic field as sensed by an idealized and calibrated magnetometer 112 of FIG. 1, and centered at the origin 204. With the magnetometer 112 located at the origin 204, the magnetometer 112 can point in any direction and senses an identical magnitude value regardless of the direction. The magnetometer 112 located at the origin 204 generates mag field measurements 126 associated with a reference to magnetic north 128 of FIG. 1. In this embodiment, the magnetometer 112 would not require the calibration process 122 as there are no errors introduced into the environment from outside influences or by defects in the construction of the magnetometer 112 itself. However, in the real world, there are at least two types of distortion possible: "hard-iron" and "soft-iron" distortion, and each will be further disclosed herein.

Figure 3:
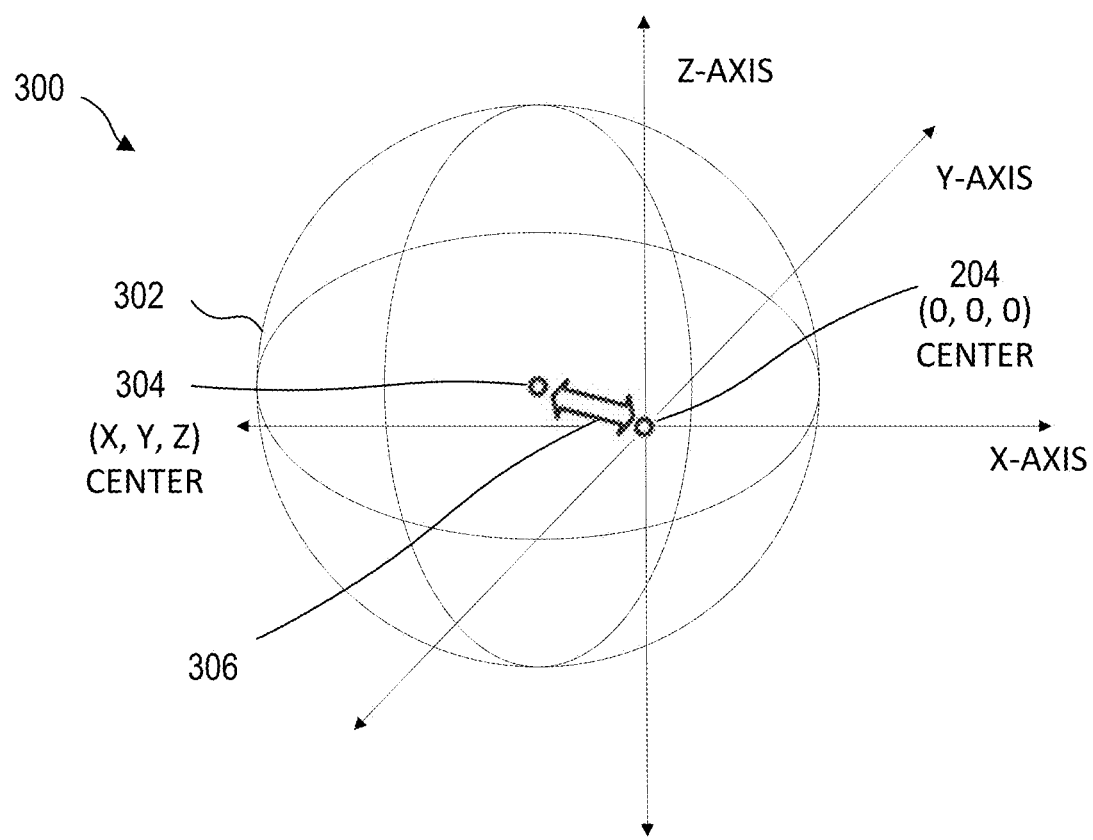
FIG. 3 is a 3-D graph illustrating a magnetic field with hard-iron distortion with the magnetic field centered at a center point in accordance with some embodiments.

FIG. 3 is a 3-D graph 300 illustrating a magnetic field 302 with hard-iron distortion with a center point 304 at (x, y, z) in accordance with some embodiments. Magnetic field 302 is a spheroid shape with the magnetic field center point 304 an offset distance 306 (offset) away from the origin 204. The offset 306 between the origin 204 and the center point 304 is caused by the presence of hard-iron distortion in the region near mobile device 102 as measured by the magnetometer 112. Hard-iron distortion creates a static bias error in the magnetometer mag field measurements 126 and is caused by external magnetic influences in the region and can include, but is not limited to, local metallic objects such as furniture, electronic components, chassis assemblies, transformers, magnets and electromagnets, building materials, vehicles, and the like. Hard-iron distortion includes materials and objects that generate their own magnetic fields, and are therefore additive in nature to the magnitude of the earth's magnetic field. To compensate for hard-iron distortion, the processor 104 of FIG. 1 mathematically adds a constant value to the mag field measurements 126 based on the extent of the distortion as sensed by the magnetometer 112.

Figure 4:
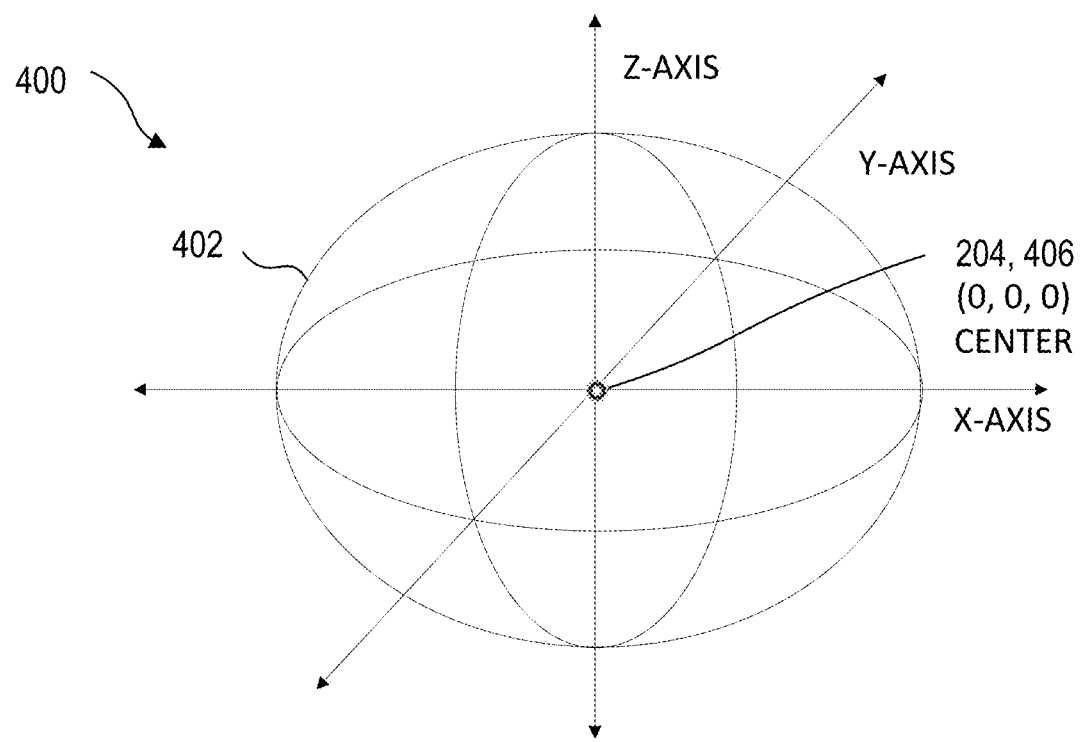
FIG. 4 s a 3-D graph illustrating a magnetic field with soft-iron distortion with the magnetic field center point centered at the origin in accordance with some embodiments.

FIG. 4 s a 3-D graph 400 illustrating a magnetic field 402 with soft-iron distortion with the magnetic field 402 center point 406 centered at the origin 204 in accordance with some embodiments. Magnetic field 402 is not a sphere but a distorted spheroid shape with a center point 406 at the origin 204. Soft-iron distortion creates a distorted sphere error in the magnetometer mag field measurements 126, but unlike hard-iron distortion, does not create an offset 306 as disclosed in FIG. 3. The soft-iron distortion creates a distorted spheroid shape and is caused by the presence of materials that distorts a magnetic field. However, unlike hard-iron distortion, the materials causing soft-iron distortion does not generate a magnetic field itself, and is therefore not additive. The distortion caused by soft-iron materials, such as iron and nickel, is dependent upon the orientation of the materials relative to the magnetometer 112 and the earth's magnetic field. Therefore, soft-iron distortion cannot be compensated for by adding a constant value to the mag field measurements 126 as disclosed in FIG. 3 for hard-iron distortion. Rather, a more complicated process is used to compensate for soft-iron distortion. In the mobile device 102, soft-iron distortion is compensated for by the mobile device 102 triggering the calibration process 122 that calculates individual values for each of the 3 axes represented by values of the mag field measurements 126 stored in memory 106.

Figure 5:
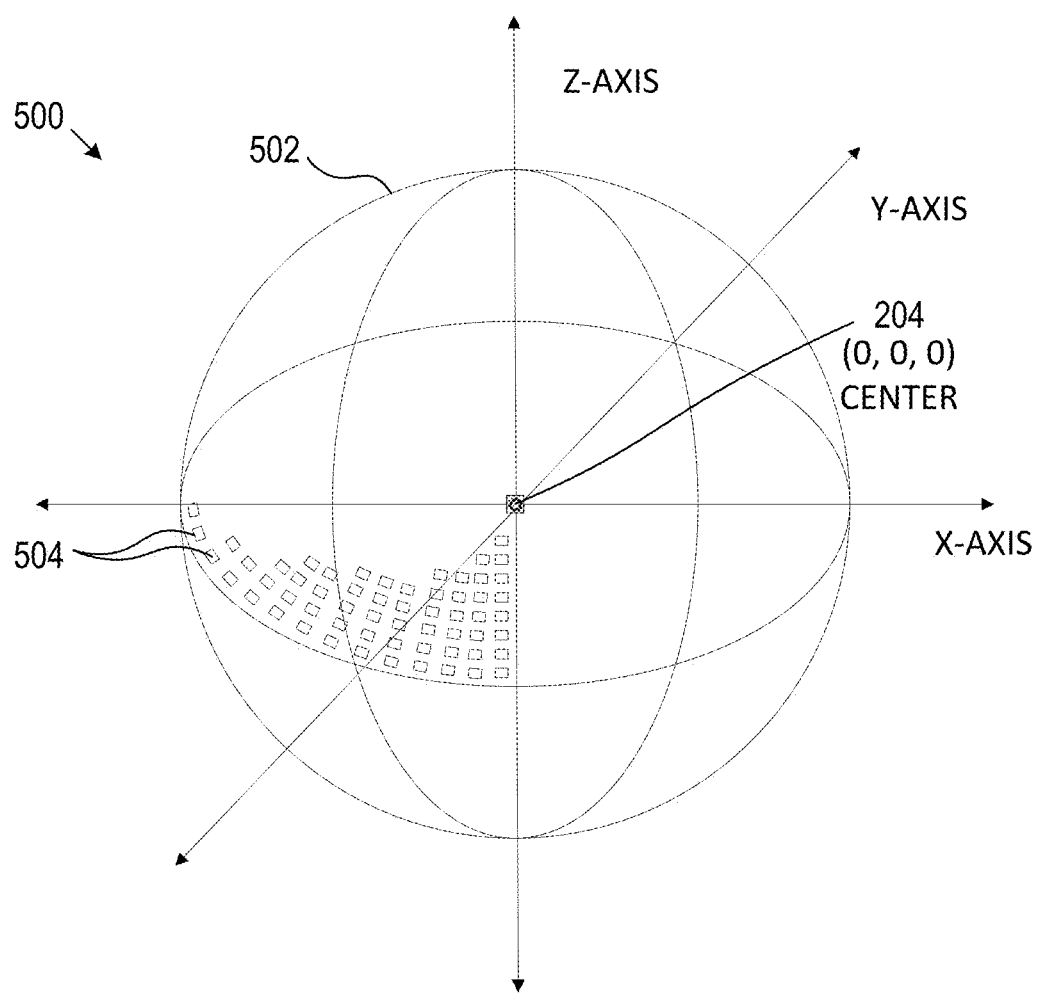
FIG. 5 is a 3-D graph illustrating a magnetometer calibration sphere in accordance with some embodiments.

FIG. 5 is a 3-D graph 500 illustrating a magnetometer calibration sphere 502 in accordance with some embodiments. Graph 500 includes the magnetometer calibration sphere 502 centered at the origin 204 with individual locations on a surface of the magnetometer calibration sphere 502 represented by a corresponding data bin 504, thus resulting in a plurality of data bins 504 representing multiple points on the surface of the magnetometer calibration sphere 502. The plurality of data bins 504 may be represented by entries in a content addressable memory (CAM), entries in a register file, and the like. The plurality of data bins 504 are located in an array arranged across the entire outer surface of the magnetometer calibration sphere 502. Each data bin 504 corresponds to a unique direction as referenced from the origin 204. For every movement of the magnetometer 112 positioned at the origin 204, the processor 104 stores 2 types of data: the mag field measurements 126 in memory 106, and a record of the point on the surface of the magnetometer calibration sphere 502 the magnetometer 112 is currently pointed towards. This record is stored to the data bin 504 that corresponds to the point on the surface of the magnetometer calibration sphere 502 being pointed to. As the non-specified movement of the mobile device 102 continues, additional samples of mag field measurements 126 are generated and stored in the memory 106 and a record of points visited (by the magnetometer 112) on the surface of the sphere 502 in data bins 504.

The calibration trigger process 120 stores a record of how many unique data bins 504 are written to. Once the calibration trigger process 120 determines that a predetermined threshold of data bins 504 have been written to, the processor 104 initiates the calibration process 122 to calibrate the magnetometer 112. In some embodiments, the threshold value can be based on a percentage of total data bins 504 written to, a length of time the mobile device 102 is in motion, the number of unique and distinct data bins 504 written to, or the like. Some examples of threshold values include 25% of different data bins 504 written to, 50% of the total number of data bins 504 written to, 200 data bins 504 written to, and the like. The number of data bins 504 present is not limiting and a variety of possible configurations are possible, including but not limited to, assigned a data bin 504 for every 5°, 1°, or ⅒ of a degree of longitude and latitude along the surface of the magnetometer calibration sphere 502, with other embodiments possible.

As the mobile device 102 undergoes non-specified motion during the calibration method 122 as disclosed herein, some data bins 504 can be written to multiple times. In some embodiments, each effort to store a record of points visited to the same data bin 504 counts as a separate write action and is counted as contributing to meeting the threshold value. In other embodiments, multiple efforts to write mag field measurements 126 to a single data bin 504 is counted only once, even if the mag field measurements 126 is refreshed by multiple write commands by the software 114 executing the data bin process 116. In yet other embodiments, some data bins 504 can be written to a random number of times in order to capture the variability of the data.

Figure 6:
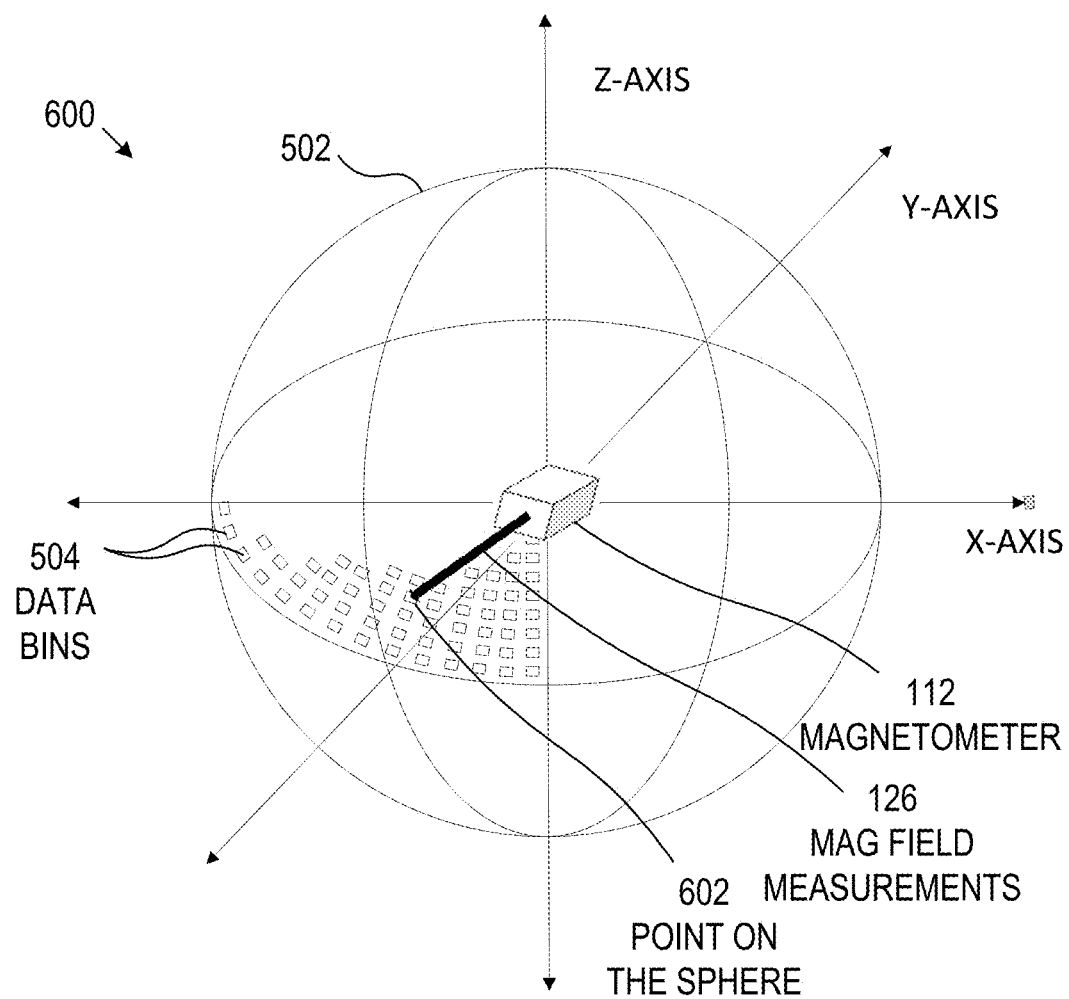
FIG. 6 is a 3-D graph illustrating the magnetometer calibration sphere with the magnetometer at the center of the sphere generating mag field measurements for storage to the data bins and memory in accordance with some embodiments.

FIG. 6 is a 3-D graph 600 illustrating the magnetometer calibration sphere 502 with the magnetometer 112 at the center of the sphere 502 generating mag field measurements 126 for storage to the data bins 504 and memory 106 in accordance with some embodiments. FIG. 6 is a continuation of the graph 500 disclosed in FIG. 5 with the magnetometer 112 at the origin 204 of the magnetometer calibration sphere 502 generating mag field measurements 126 along a direction and pointing to a point 602 on the surface of the magnetometer calibration sphere 502 corresponding to a specific data bin 504. As the magnetometer 112 moves in relation to the magnetometer calibration sphere 502, additional data bins 504 are pointed to, and the mag field measurements 126 associated with that direction are recorded in memory 106. Additionally, a record of a point on the sphere 602 visited by the magnetometer 112 is stored in the data bin 504 associated with the point on the sphere 602. In this manner, multiple data bins 504 are written to, providing a record, or track, of the movement of the magnetometer 112 in relation to the magnetometer calibration sphere 502 as disclosed herein. In at least some embodiments, the processor 104 stores a record of the points 602 on the sphere to the data bins 504 that the magnetometer 112 points towards. Mag field measurements 126 are stored in the memory 106, and the mag field measurements 126 can be refreshed over time by rewriting identical or new mag field measurements 126 into the memory 106. This process of refreshing the data bins 504 and the memory 106 ensures that the data stored is maintained during processor 104 operations. In a similar manner, some embodiments show the processor 104 refreshing data bin 108 and memory 106 locations in a random manner to ensure the freshest data is maintained over time.

In at least some embodiments, the processor 104 analyzes the mag field measurements 126 stored in the memory 106 for quality-of-fit of the data as compared to expected quality levels and is based on historical mag field measurements 126. The processor 104 then generates a confidence metric based on the quality of the mag field measurements 126 using the calibration values process 124. The calibration values process 124 calculates the quality-of-fit values on a continual basis, or periodically as requested by other applications running on the mobile device 102. The quality-of-fit values describe how well a set of data, such as mag field measurements 126, fits a statistical model. The quality-of-fit gives an estimate between observed values and expected values. The quality-of-fit data can be used for numerical analysis of the data to include statistical hypothesis testing, tests for normality, variance analysis, and distribution analysis. Other data modeling and analysis is possible and is not limited by the examples disclosed herein.

The calibration values process 124 also generates a set of confidence metric values. The confidence metric values are based on comparing older mag field measurements 126 to current mag field measurements 126. If a match is determined by the processor 104, a "confidence of the match" value is generated using theoretical constant data related to the earth's magnetic field, with the theoretical constant data calculated from historical magnetometer data. If the confidence of the match values exceeds a predetermined threshold level, historical calibration data can be used to calibrate the magnetometer 112. If the confidence of the match values does not exceed the confidence threshold, the calibration process 122 can be initiated to generate new calibration values to calibrate the magnetometer 112. When the processor 104 executes the calibration values process 124, the process 124 generates calibration values for calibrating the output of the magnetometer 112. The processor 104 also executes a separate process called the calibration watchdog process 128 that monitors the calibration values generated by the calibration values process 124. When the calibration watchdog process 128 detects errors in the data that exceed a predetermined threshold, the processor 104 initiates the calibration process 122 to begin an immediate calibration of the magnetometer 112. The calibration watchdog process 128 can run continuously, or run as requested by the processor 104.

Figure 7:
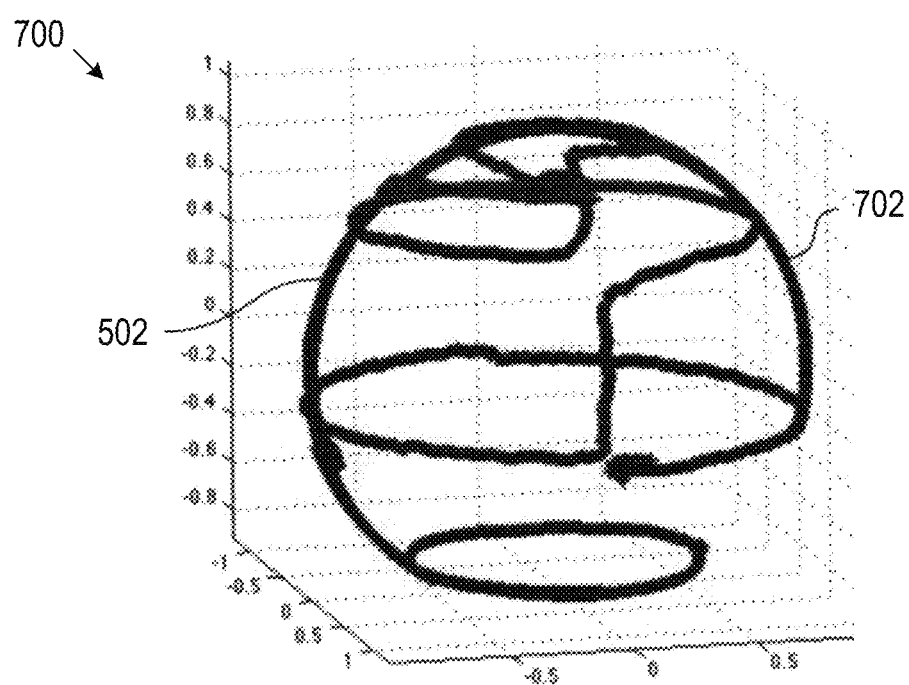
FIG. 7 is a 3-D graph illustrating the tracking of movement of a magnetometer within a magnetometer calibration sphere using an inertial measurement unit (IMU) in accordance with some embodiments.

FIG. 7 is a 3-D graph 700 illustrating the tracking of movement of a magnetometer 112 within a magnetometer calibration sphere 502 using an IMU in accordance with some embodiments. Graph 700 is titled "Orientation Look Graph" and includes magnetometer movement track 702 showing a history of locations on the surface of the magnetometer calibration sphere 502 of FIG. 5 where the magnetometer 112 has previously pointed towards. The Orientation Look Graph 700 includes track 702 that displays the movement of the magnetometer 112 across a significant portion of the magnetometer calibration sphere 502, with coverage of both upper and lower hemispheres and left and right hemispheres. Track 702 displays the orientation trajectory of the magnetometer 112 using IMU measurements. Tracking the movement of the magnetometer 112 allows the calibration process to start when the history of locations on the surface of the magnetometer calibration sphere 502 exceeds a specified threshold value. Tracking also allows the detection of a loss of calibration when the magnetometer movement track 702 diverges significantly from expected values.

Figure 8:
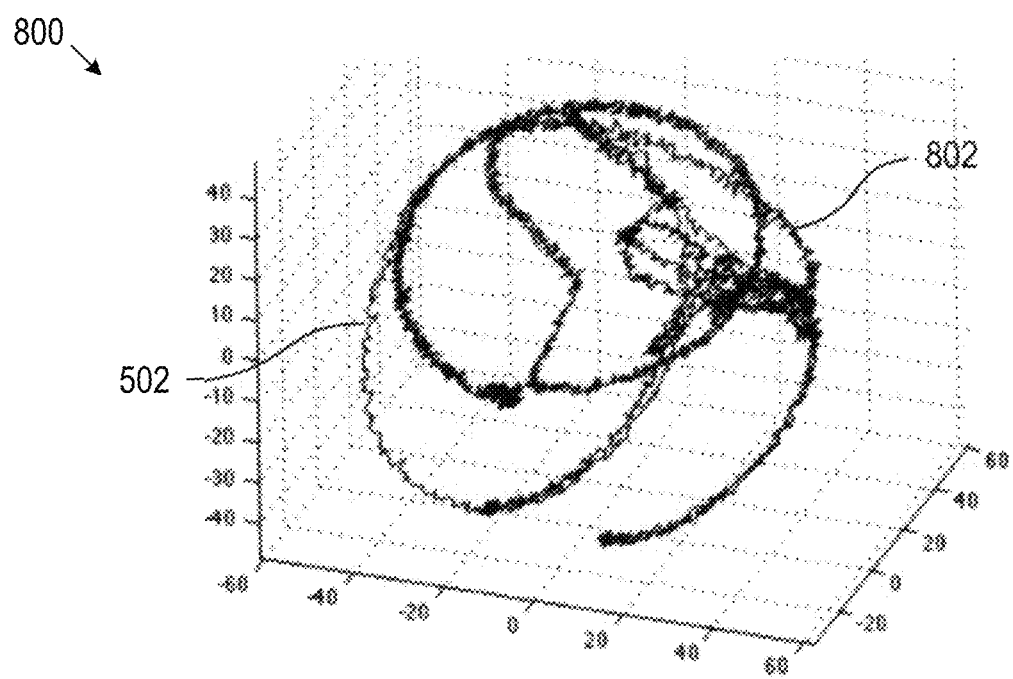
FIG. 8 is a 3-D graph illustrating a magnetometer calibration sphere with mag field measurements stored in data bins and memory in accordance with some embodiments.

FIG. 8 is a 3-D graph 800 illustrating a magnetometer calibration sphere 502 with mag field measurements 126 stored in memory 106 and points 504 on the sphere 502 visited in the data bins 108 in accordance with some embodiments. Graph 800, titled "Raw Magnetometer Reading Graph", discloses a track 802 of the movement of magnetometer 112 along the surface of the magnetometer calibration sphere 502. Graph 800 is similar to graph 700 of FIG. 7; however, while graph 700 shows the apparent tracking of the magnetometer 112 itself using IMU readings, graph 800 discloses the raw magnetometer readings, also known as mag field measurements 126 that are stored in the memory 106. When calibrated, the track 802 should approximate the user's actual motion, and also be in agreement the track 702 of FIG. 7 as measured by the IMU.

Figure 9:
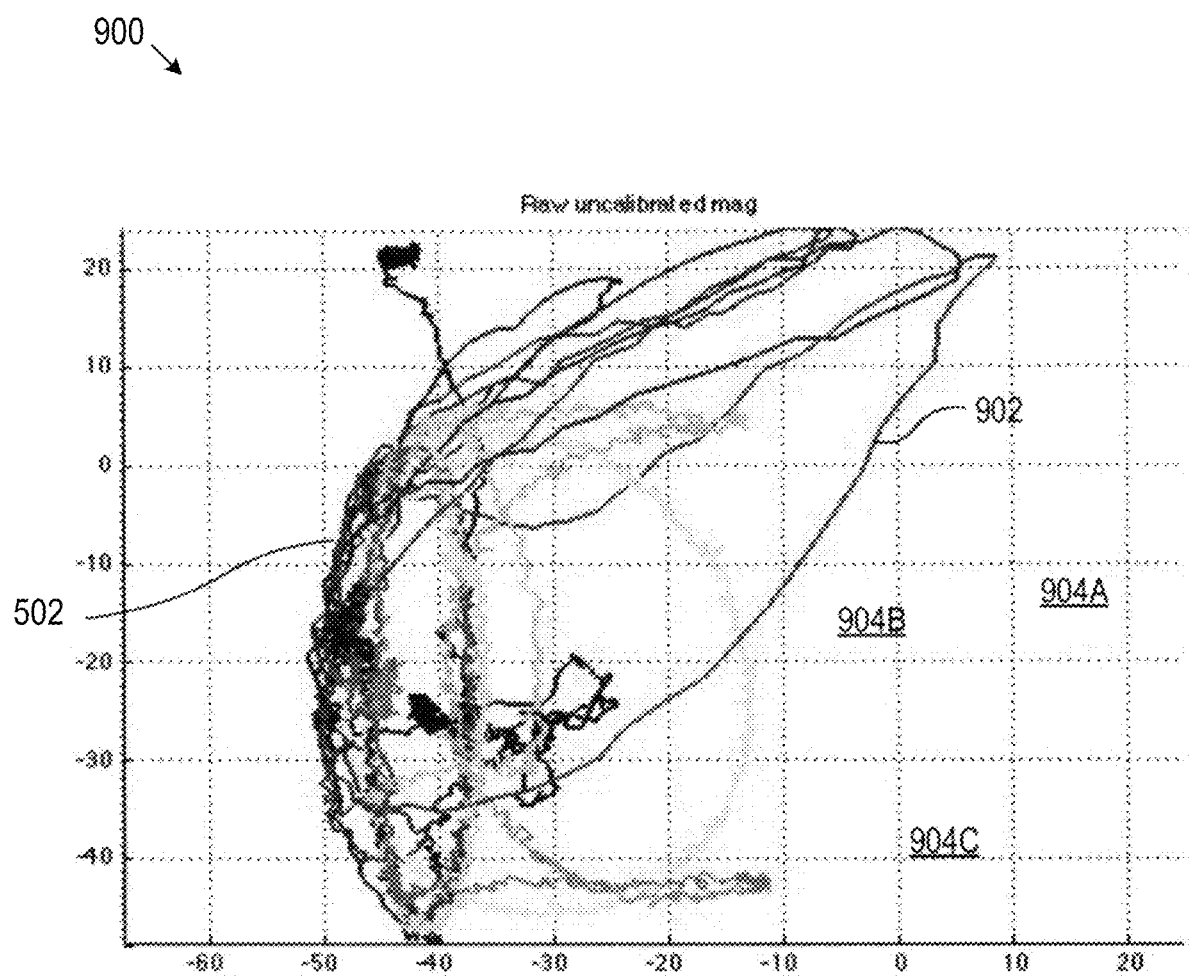
FIG. 9 is a 3-D graph illustrating the tracking of an insufficient amount of movement of the magnetometer using the magnetometer calibration sphere in accordance with some embodiments.

FIG. 9 is a 3-D graph 900 illustrating the tracking of an insufficient amount of movement of the magnetometer 112 along the magnetometer calibration sphere 502 in accordance with some embodiments. Graph 900 is titled "Insufficient Movement of Mobile Device" and discloses a series of tracks 902 showing significant movement of the magnetometer 112 along the surface of the magnetometer calibration sphere 502. However, there are present several regions 904A, 904B, 904C of the magnetometer calibration sphere 502 toward which the magnetometer 112 did not point, and as such, no mag field measurements 126 have been generated for those areas. Explained in another way, tracks 902 display an orientation trajectory from magnetometer measurements when the calibration is incorrect or non-existent. In this example, calibration cannot be performed as there is insufficient coverage of the magnetometer calibration sphere 502. Tracks 902 diverge significantly from track 702 of FIG. 7. By comparing track 702 to tracks 902, the user can detect a loss of calibration. In the present embodiment, based on the threshold set by the processor 104, the processor 104 may determine that an insufficient number of data bins 108 have been written to, and will not trigger the calibration process 122 based on the threshold not be satisfied. The data bin process 106 of recording non-specified motion of the magnetometer 112 as it is aligned with points on the surface of the magnetometer calibration sphere 502 will continue until the threshold limit is reached.

Figure 10:
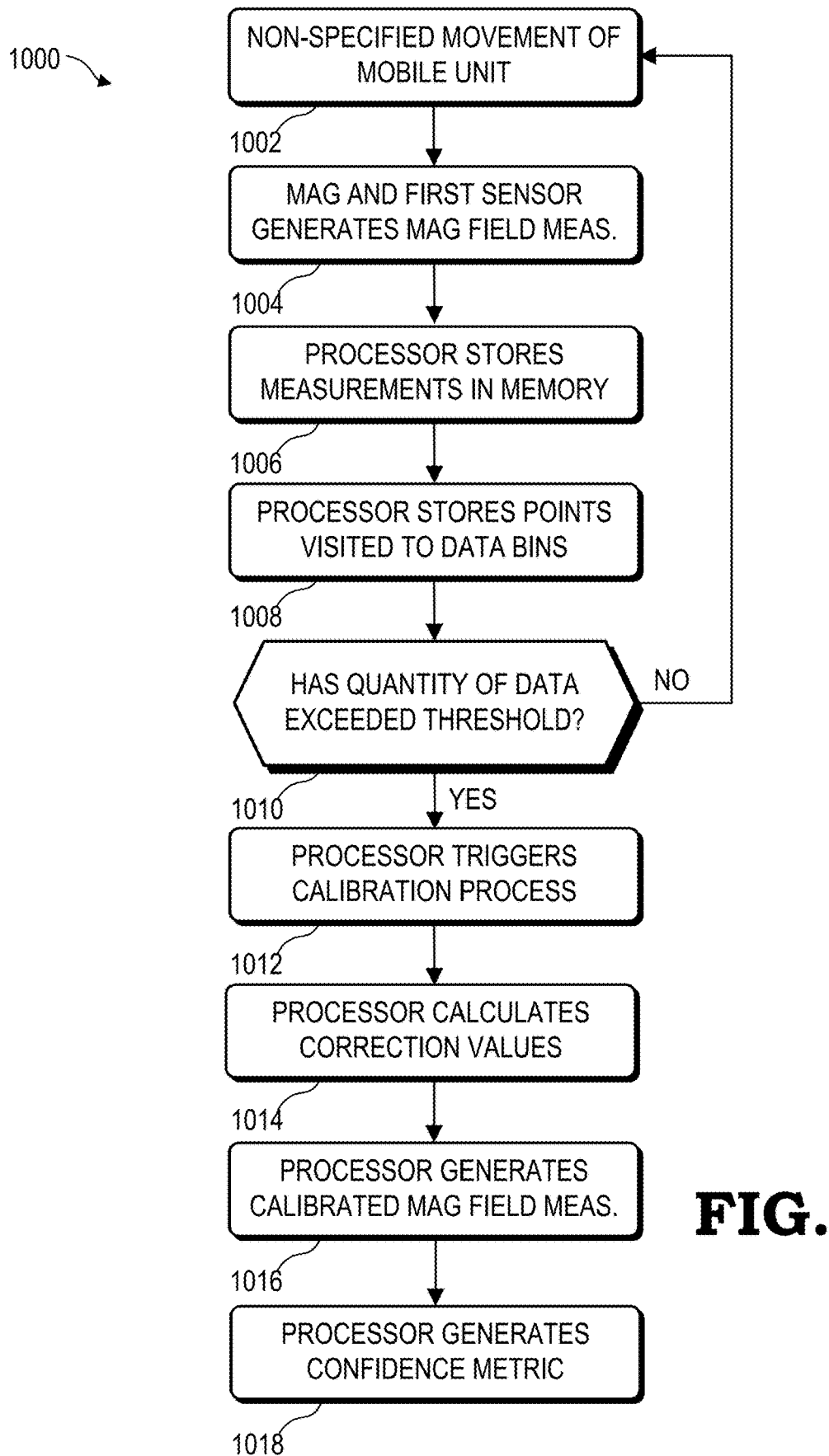
FIG. 10 illustrates a flow diagram of an automatic magnetometer calibration procedure by a mobile device in accordance with some embodiments.

FIG. 10 illustrates a flow diagram of an automatic magnetometer calibration procedure 1000 by a mobile device 102 in accordance with some embodiments. In at least one embodiment, the automatic magnetometer calibration procedure 1000 is associated with the mobile device 102 of FIG. 1. The automatic magnetometer calibration procedure 1000 begins with the mobile device 102 executing a series of non-specified movements at block 1002. The mobile device's 102 non-specific movement results from the user moving the mobile device 102 while running software applications such as sending and responding to email and texts, searching the internet, or participating in online gaming. Next, while the mobile device 102 moves, the magnetometer 112 generates mag field measurements 126 at block 1004, which the processor 104 then stores in the memory 106 at block 1006. Next, at block 1008, the processor 104 stores the "points visited" data in the plurality of data bins 108 as a record of the number of directions the magnetometer 112 has pointed to. Next, at block 1010, the processor 104 runs the software calibration trigger process 120 to determine whether the number of points visited by the magnetometer 112 exceeds the predetermined threshold. If the answer to the question at block 1010 is "no", then the processor 104 starts the automatic magnetometer calibration procedure 1000 over again by returning to block 1002. If the answer is "yes", then the automatic magnetometer calibration procedure 1000 continues with block 1012 by the processor 104 triggering the software calibration process 122 and executing any one of several approaches to generate correction values as disclosed herein. At block 1014, the automatic magnetometer calibration procedure 1000 continues with the processor 104 generating a set of correction values based on historical mag field measurements 126, current location, current mag field measurements 126, and the like. Next, at block 1016, the processor 104 mathematically adds the correction values to the mag field measurements 126 both in memory 106 and currently being generated by the magnetometer 112 to form calibrated mag field measurements 126. Next, at block 1018, the processor 104 executes the software calibration values process 124 and the calibration watchdog process 128 to calculate a confidence metric, a quality-of-fit values, and to determine whether an additional software calibration process 122 is required. The automatic magnetometer calibration procedure 1000 thus can calibrate a magnetometer 112 automatically without prompting by the user and without requesting specific motions by the user, and can be applied to multiple applications simultaneously running on a mobile device 112.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., RAM or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
monitoring, at a processor of a mobile device, a stream of magnetic field measurements generated by a first sensor of the mobile device as the mobile device is manipulated by a user, each magnetic field measurement representing an orientation of the mobile device relative to a reference frame;
for each magnetic field measurement of a set of magnetic field measurements of the stream, determining, at the processor, a point on a surface of a magnetometer calibration sphere associated with the orientation of the mobile device represented by that magnetic field measurement, and storing the magnetic field measurement to a corresponding data bin of a plurality of data bins, each data bin of the plurality associated with a corresponding point on the surface of the magnetometer calibration sphere; and
responsive to determining that a number of data bins containing magnetic field measurements exceeds a threshold, wherein a value of the threshold is based on a percentage of total data bins written to and a length of time the mobile device is manipulated by the user, triggering, by the processor, a magnetometer calibration process for a magnetometer of the mobile device.

2. The method of claim 1, further comprising:
generating, by a magnetometer, magnetometer data indicating the orientation of the mobile device in relation to magnetic north.

3. The method of claim 1, further comprising:
assigning a gap corresponding to a degree of longitude and latitude between points on the surface of the magnetometer calibration sphere for storing the magnetic field measurements in the plurality of data bins.

4. The method of claim 1, wherein the first sensor is an inertial measurement unit and assists in a pose determination of the mobile device.

5. The method of claim 1, wherein the manipulation of the mobile device by the user is during normal, non-calibration-directed use of the mobile device by the user.

6. The method of claim 1, further comprising:
generating, by the processor, a confidence metric based on quality-of-fit calculations using the magnetic field measurements.

7. The method of claim 1, further comprising:
triggering an additional magnetometer calibration process responsive to detecting, by a calibration watchdog process running on the processor, errors in a set of calibration values above a predetermined threshold.

8. The method of claim 1, wherein the magnetometer calibration process uses the magnetic field measurements to compensate for hard-iron and soft-iron disturbances.

9. A method comprising:
monitoring, at a processor of a mobile device, a stream of magnetic field measurements generated by a first sensor of the mobile device as the mobile device is manipulated by a user, each magnetic field measurement representing an orientation of the mobile device relative to a reference frame;
monitoring, at the processor of the mobile device, a stream of location values generated by a second sensor of the mobile device, each location value representing a location of the mobile device relative to latitude and longitude coordinate values;
for each position value and magnetic field measurement of a set of magnetic field measurements of the stream, determining, at the processor, a point on a surface of a magnetometer calibration sphere associated with the orientation of the mobile device represented by that magnetic field measurement, and storing the magnetic field measurement to a corresponding data bin of a plurality of data bins, each data bin of the plurality associated with a corresponding point on the surface of the magnetometer calibration sphere; and
responsive to determining that a number of data bins containing magnetic field measurements exceeds a specified threshold, wherein a value of the specified threshold is based on a number of total data bins written to and a duration the mobile device is manipulated by the user, triggering, by the processor, a magnetometer calibration process for a magnetometer of the mobile device.

10. The method of claim 9, wherein the second sensor is a global positioning satellite sensor.

11. A mobile device comprising:
a magnetometer;
a first sensor configured to generate a stream of magnetic field measurements as the mobile device is manipulated by a user, each magnetic field measurement representing an orientation of the mobile device relative to a reference frame; and
a processor coupled to the magnetometer and the first sensor, the processor configured to:
for each magnetic field measurement of a set of magnetic field measurements of the stream, determine a point on a surface of a magnetometer calibration sphere associated with the orientation of the mobile device represented by that magnetic field measurement, and store the magnetic field measurement to a corresponding data bin of a plurality of data bins, each data bin of the plurality associated with a corresponding point on the surface of the magnetometer calibration sphere; and
responsive to determining that a number of data bins containing magnetic field measurements exceeds a threshold, wherein a value of the threshold is based on a percentage of total data bins of the plurality written to and a time the mobile device is manipulated by the user, trigger a magnetometer calibration process for the magnetometer of the mobile device.

12. The mobile device of claim 11, wherein the magnetometer generates magnetometer data indicating the orientation of the mobile device in relation to magnetic north.

13. The mobile device of claim 11, wherein the first sensor is an inertial measurement unit.

14. The mobile device of claim 11, wherein the first sensor assists in a pose determination of the mobile device.

15. The mobile device of claim 11, wherein the user manipulates the mobile device during normal, non-calibration-directed use of the mobile device.

16. The mobile device of claim 11, further comprising:
a confidence metric, generated by the processor, based on quality-of-fit calculations using the magnetic field measurements.

17. The mobile device of claim 11, further comprising:
a calibration watchdog process, running on the processor, that triggers an additional magnetometer calibration process responsive to detecting errors in a set of calibration values above a predetermined threshold.

18. The mobile device of claim 11, wherein the magnetometer calibration process uses the magnetic field measurements to compensate for hard-iron and soft-iron disturbances.

19. The mobile device of claim 11, further comprising:
position data, generated by a second sensor associated with the mobile device, related to a defined coordinate system.

20. The mobile device of claim 18, wherein the second sensor is a global positioning satellite sensor related to latitude and longitude coordinate values.

* * * * *